United States Patent
Hung

(10) Patent No.: US 8,313,820 B2
(45) Date of Patent: *Nov. 20, 2012

(54) ACTUATOR WITH CARBON NANOTUBE YARNS

(75) Inventor: Hsin-Chin Hung, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 605 days.

This patent is subject to a terminal disclaimer.

(21) Appl. No.: 12/472,297

(22) Filed: May 26, 2009

(65) Prior Publication Data

US 2010/0047514 A1   Feb. 25, 2010

(30) Foreign Application Priority Data

Aug. 19, 2008  (CN) .......................... 2008 1 0304042

(51) Int. Cl.
*B32B 5/12* (2006.01)
(52) U.S. Cl. ......... 428/114; 977/742; 977/750; 977/752
(58) Field of Classification Search .................. None
See application file for complete search history.

(56) References Cited

U.S. PATENT DOCUMENTS

| 7,045,108 | B2 | 5/2006 | Jiang et al. | |
| 7,994,477 | B2 * | 8/2011 | Hung | .......................... 250/338.1 |
| 2008/0292887 | A1 * | 11/2008 | Kim et al. | ..................... 428/426 |

* cited by examiner

*Primary Examiner* — Camie Thompson
(74) *Attorney, Agent, or Firm* — Altis Law Group, Inc.

(57) ABSTRACT

An exemplary actuator based on CNT yarns includes a base and a composite film mounted on a surface of the base. The composite film is extendable in a predetermined direction substantially perpendicular to the surface of the base in response to light irradiation applied thereupon. The composite film includes a polymer layer, a plurality of semiconducting CNT yarns dispersed in the polymer layer, and a plurality of metallic CNT yarns dispersed in the polymer layer. A longitudinal of each semiconducting CNT yarn is substantially parallel with the direction. Each semiconducting CNT yarn includes a plurality of twisted semiconducting CNTs. A longitudinal of each metallic CNT yarn is substantially parallel with the direction. Each metallic CNT yarn includes a plurality of twisted metallic CNTs.

7 Claims, 1 Drawing Sheet

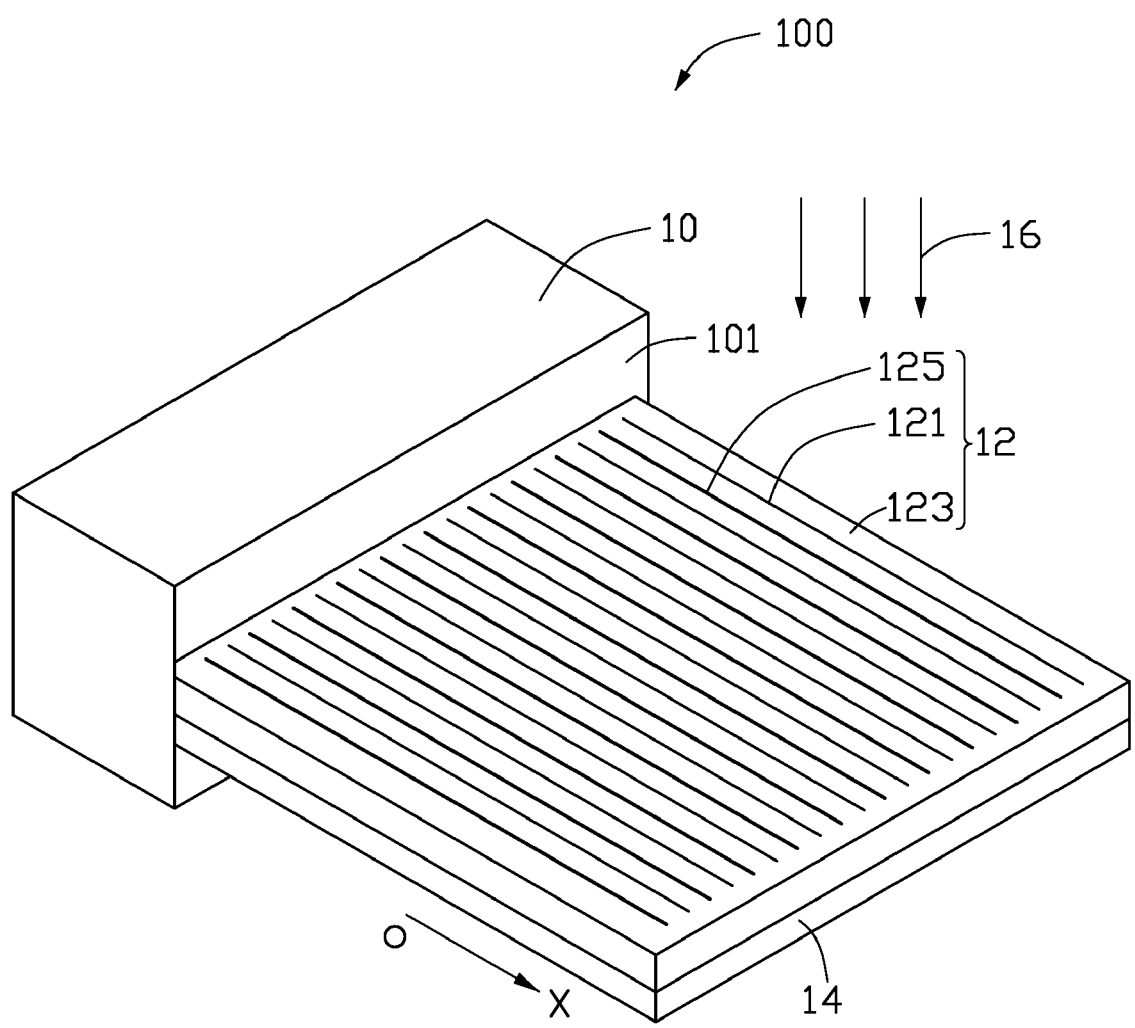

ACTUATOR WITH CARBON NANOTUBE YARNS

This application is related to a commonly-assigned U.S. application, Ser. No. 12/472,303, entitled "INFRARED DETECTOR WITH CARBON NANOTUBE YARNS", now issued as U.S. Pat. No. 7,994,477. Disclosures of the above-identified application are incorporated herein by reference.

BACKGROUND

1. Technical Field

The present invention relates to actuators, and particularly to an actuator with carbon nanotube (CNT) yarns.

2. Description of Related Art

Typical actuators include, for example, stepper motors. When employing such actuators, a gear assembly is usually required to transform the rotational movement of the actuators into a linear movement. However, the existence of the gear assembly generally renders the camera modules unduly bulky. Furthermore, the occurrence of backlash/recoil in the gear assembly may result in degraded focusing accuracy.

Therefore, a new actuator is desired to overcome the above mentioned problems.

BRIEF DESCRIPTION OF THE DRAWING

Many aspects of the embodiment can be better understood with references to the following drawing. The components in the drawing are not necessarily drawn to scale, the emphasis instead being placed upon clearly illustrating the principles of the present embodiment.

The drawing is a schematic, isometric view of an actuator based on CNT yarns according to an exemplary embodiment.

DETAILED DESCRIPTION

Embodiments will now be described in detail below with reference to the drawings.

Referring to the drawing, an actuator 100 based on CNT yarn according to an exemplary embodiment is provided. The actuator 100 includes a base 10 with a surface 101, a composite film 12 and a reflective film 14 formed on a surface of the composite film 12. One end of the composite film 12 is fixed on the surface 101.

The composite film 12 includes a polymer layer 123, a plurality of metallic CNT yarns 125, and a plurality of semiconducting CNT yarns 121 dispersed in the polymer layer 123. The polymer layer 123 is light-pervious. A material of the polymer layer 123 is selected from the group consisting of acrylate rubber, polydimethylsiloxane, and polycarbonates. When the composite film 12 is illuminated by a light beam 16 (e.g., an infrared light beam), the composite film 12 is capable of extending in a direction OX substantially perpendicular to the surface 101 of the base 10 (described in detail later). A longitudinal of each semiconducting CNT yarn 121 is substantially parallel with the direction OX, and so is a longitudinal of each metallic CNT yarn 125. A length of each semiconducting CNT yarn 121 along the longitudinal is substantially equal to a length of the composite film 12 in the direction OX, and a length of the metallic CNT yarn 125 along the longitudinal is substantially equal to the length of the composite film 12 in the direction OX. Each semiconducting CNT yarn 121 includes a plurality of semiconducting CNTs (not shown) twisted together. Each metallic CNT yarn 125 includes a plurality of metallic CNTs (not shown) twisted together. Each semiconducting CNT and each metallic CNT can be single-walled or multi-walled. The semiconducting CNT yarn and the metallic CNT yarn can be, but not limited to, products of many companies, such as Mknano, which locates in M.K. Impex Canada, 6382 Lisgar Drive, Mississauga, Ontario L5N 6X1, Canada. Also, the semiconducting CNT yarn and the metallic CNT yarn can be fabricated using a method similar to the method as disclosed in U.S. Pat. No. 7,045,108, which is incorporated herein by reference.

The reflective film 14 is configured for reflecting the light beam 16 passing through the composite film 12 back to the composite film 12. Since the composite film 12 is light-pervious, the reflective film 14 can increase efficiency of utilizing the light beam 16.

In operation, when the composite film 12 is irradiated by the light beam 16 with a particular wavelength (e.g., an infrared light beam), the semiconducting CNTs are excited to generate a plurality of negatively-charged electrons and positively-charged holes. The electrons and the holes move along the metallic CNTs, and, accordingly, a static electric field is formed in the composite film 12. Then, the semiconducting CNT yarns 121 and the metallic CNT yarns 125 extend in the direction OX and, therefore, drive the composite film 12 to extend in the direction OX. Thus, when an object (not shown) is fixed on a surface of the composite film 12 away from the base 10, the composite film 12 is capable of driving the object to move along the direction OX. An amount of elongation of the composite film depends on an amount of the semiconducting CNT yarns 121 and metallic CNT yarns 125, and a length of each semiconducting CNT 121 yarn and metallic CNT yarn 125. The larger the amount of the semiconducting CNT yarns 121 and the metallic CNT yarns 125 is, the larger the length of each semiconducting CNT yarn 121 and metallic CNT yarn 125 is, the larger the amount of elongation of the composite film is. When the light beam 16 is removed from the composite film 12, each semiconducting CNT yarn 121 and each metallic CNT yarn 125 restore to an initial length, thereby driving the composite film 12 to restore to an initial length.

In the present embodiment, the actuator 100 performs a linear movement. Hence, it is no need to employ a gear assembly to transform the rotational movement of the actuators into a linear movement. Furthermore, the occurrence of backlash/recoil in the gear assembly is eliminated.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. An actuator comprising:
   a base; and
   a composite film mounted on a surface of the base, the composite film being extendable in a predetermined direction substantially perpendicular to the surface of the base in response to light irradiation applied thereupon, the composite film comprising:
      a polymer layer;
      a plurality of semiconducting carbon nanotube (CNT) yarns dispersed in the polymer layer, a longitudinal axis of each semiconducting CNT yarn being substantially parallel with the predetermined direction, each semiconducting CNT yarn comprising a plurality of twisted semiconducting CNTs; and
      a plurality of metallic CNT yarns dispersed in the polymer layer, a longitudinal axis of each metallic CNT yarn being substantially parallel with the predetermined direction, each metallic CNT yarn comprising a plurality of twisted metallic CNTs.

2. The actuator of claim 1, wherein a length of each of the semiconducting CNT yarns and metallic CNT yarns along the longitudinal axis is substantially equal to a length of the composite film in the predetermined direction.

3. The actuator of claim 1, wherein each of the semiconducting CNTs and metallic CNTs is single-walled or multi-walled.

4. The actuator of claim 1, further comprising a reflective film formed on a surface of the composite film, wherein the reflective film is configured for reflecting a light beam passing through the composite film back to the composite film.

5. The actuator of claim 1, wherein the polymer layer is light-pervious.

6. The actuator of claim 1, wherein the material of the polymer layer is selected from the group consisting of acrylate rubber, polydimethylsiloxane, and polycarbonates.

7. The actuator of claim 1, wherein the composite film is extendable in response to infrared light irradiation.

* * * * *